United States Patent [19]
Suzuki et al.

[11] Patent Number: 5,517,377
[45] Date of Patent: May 14, 1996

[54] ENDLESS-LOOP TAPE CASSETTE WITH BACKSTOP AND TRANSMISSION MECHANISM

[75] Inventors: Hiroki Suzuki; Takateru Satoh; Hitoshi Koshimizu, all of Tokyo, Japan

[73] Assignee: TDK Corporation, Tokyo, Japan

[21] Appl. No.: 220,705

[22] Filed: Mar. 31, 1994

[30] Foreign Application Priority Data

| Apr. 19, 1993 | [JP] | Japan | 5-114153 |
| Jul. 6, 1993 | [JP] | Japan | 5-191656 |
| Dec. 24, 1993 | [JP] | Japan | 5-345880 |
| Dec. 24, 1993 | [JP] | Japan | 5-345881 |

[51] Int. Cl.$^6$ ............ G11B 23/06; G11B 15/70; G11B 15/48
[52] U.S. Cl. ............ 360/132; 242/325.2; 242/326.3
[58] Field of Search ............ 360/132; 242/325, 242/325.1, 325.2, 325.3, 326.2, 326.3, 326.4, 327, 327.3, 328, 328.2

[56] References Cited

U.S. PATENT DOCUMENTS

| 3,559,908 | 2/1971 | Esashi | 242/326.2 |
| 3,633,837 | 1/1972 | Esashi et al. | 242/326.2 |
| 5,402,955 | 4/1995 | Takahashi et al. | 360/132 |

FOREIGN PATENT DOCUMENTS

| 45-40753 | 12/1970 | Japan . |
| 49-7488 | 2/1974 | Japan . |
| 50-18387 | 6/1975 | Japan . |
| 1443628 | 7/1976 | United Kingdom . |

Primary Examiner—Stuart S. Levy
Assistant Examiner—Craig A. Renner
Attorney, Agent, or Firm—Oblon, Spivak, McClelland, Maier & Neustadt

[57] ABSTRACT

An endless-loop tape cassette includes an endless-loop magnetic tape; and a disk which has a portion of the magnetic tape wound in a stack thereon, and which is rotatable along with one of a supply reel shaft and a take-up reel shaft. In addition, a rotating member is provided, which is rotatable along with the other one of the supply reel shaft and the take-up reel shaft. A transmission mechanism transmits a rotary movement between the disk and the rotating member; and a backstop is engageable with at least one of the disk, the rotating member and the transmission mechanism.

19 Claims, 16 Drawing Sheets

ENDLESS-LOOP TAPE CASSETTE WITH BACKSTOP AND TRANSMISSION MECHANISM

BACKGROUND OF THE INVENTION

1. Field of the Invention

The present invention relates to an endless-loop tape cassette wherein a magnetic tape such as an audio tape, or a tape such as a cleaning tape is wound and housed, and which is cooperable with an automatic shut-off, an autoreverse mechanism and the like.

2. Discussion of Background

As shown in FIG. 26, a conventional endless-loop tape cassette has such a structure that a hub a is rotatably arranged so as to be fitted on a central annular projection b of a disk d, and a magnetic tape c is wound in a stack around the hub a on the disk d. When the disk is driven for rotation, the wound tape is subjected to a rotation force in the direction indicated by an arrow A. In addition, the tape c is drawn out of the inside of the stack in the direction indicated by an arrow B by a pinch roller and a capstan. The tape c is pulled past a guide roller and returned to the outside of the stack to be wound. When the tape is drawn out, the rotation force indicated by the arrow A gives a feeding force to the tape, and the hub a is freely rotatable. As a result, the tape is unlikely to be tightly wound, and a tape drawing force is minimized, allowing wow to decrease.

The conventional endless-loop tape cassette which has a supply reel side free can not be set to be used in a cassette recorder wherein an automatic shut-off detector is provided on a tape supply shaft, or a cassette player on a vehicle wherein a tape is prevented from being loosely wound and is automatically ejected. When the traveling of the tape is reversed in a cassette recorder with an autoreverse function, the tape can not be wound, creating a problem in that the tape has traveling trouble.

SUMMARY OF THE INVENTION

It is an object of the present invention to eliminate the disadvantages of the conventional endless-loop tape cassette, and to provide a new and improved endless-loop tape cassette having a simple structure in an inexpensive manner, capable of traveling a tape accurately and stably even in a cassette recorder with an autoreverse mechanism or the like, of significantly improving reliability, and of increasing customer appeal.

The foregoing and other object of the present invention have been attained by providing an endless-loop tape cassette comprising: an endless-loop magnetic tape; a disk which has a portion of the magnetic tape wound in a stack thereon, and which is rotatable along with one of a supply reel shaft and a take-up reel shaft; a rotating member which is rotatable along with the other one of the supply reel shaft and the take-up reel shaft; a transmission mechanism which transmits a rotary movement between the disk and the rotating member; and a backstop which is engageable with at least one of the disk, the rotating member and the transmission mechanism.

It is preferable that the disk 15 rotatable along with the supply reel shaft.

It is preferable that the disk has an outer circumference provided with a gear.

It is preferable that the transmission mechanism comprises a gear.

It is preferable that the rotating member comprises a hub-shaped annular projection gear.

It is preferable that either one of the rotating member and the transmission mechanism coaxially supports a supporter with a stopper operating member so as to be rotatable in a friction-contact state.

It is preferable that the backstop comprises an engagement portion and a tape pressing portion, the engagement portion engageable with one of the disk, the rotating member and the transmission mechanism to stop the rotary movement thereof.

It is preferable that the engagement portion is provided with a projection.

It is preferable that the pressing portion includes a material having a high coefficient of friction.

It is preferable that the backstop comprising a link and a lever, the link having one end engageable with the transmission mechanism and being supported by a cassette half, the lever having one end rotatably coupled to the link and the other end provided with a tape pressing portion.

It is preferable that the backstop is slidable along a guide rib on a cassette half.

It is preferable that the rotating member coaxially supports a supporter with an operating lever so as to be relatively rotatable with respect thereto in a friction-contact state, and the operating lever is engageable with the backstop.

It is preferable that the supporter comprises a frame which is in either one of a U-shape and an annular shape along an outer circumference of an annular projection of the rotating member, and the frame has a plurality of projections arranged on an inner circumference thereof at intervals, the projections being in a friction-contact state with the outer circumference of the annular projection of the rotating member.

It is preferable that the supporter comprises an endless annular frame which has a thin-walled portion, and the thin-walled portion is formed with a deformation-absorbing portion.

It is preferable that the engagement portion of the backstop comprises a tooth formation which has an upper surface orthogonal to a sliding direction of the backstop formed to be flat and a lower surface formed to be curved when a headhouse of a cassette half is directed downward.

It is preferable that the tape pressing portion is in one of an arc shape and a wedge-like shape along an outer circumference of a tape guide roller.

It is preferable that the backstop comprises an arm having a substantial C-shape, and the arm has an engagement side formed with an engagement notch.

It is preferable that the rotating member coaxially supports a supporter with an operating lever and an engagement lever so as to be rotatable in an idle manner, the transmission mechanism coaxially supports a cooperating member engageable with the engagement lever so as to be relatively rotatable with respect thereto in a friction-contact state, and the operating lever is engaged with the backstop.

It is preferable that the engagement lever is formed with an engagement hole, the cooperating member comprises a wire, and the wire has one end wound on a shaft of the transmission mechanism and the other end bent and held in the engagement hole.

It is preferable that the supporter comprises a cylindrical member, and the cylindrical member has the operating lever and the engagement lever individually projected from an outer circumference thereof.

The endless-loop tape cassette according the present invention can be used without trouble in a cassette recorder or player wherein an automatic shut-off detector is provided on a tape supply shaft, a cassette player on a vehicle wherein a tape is prevented from being loosely wound and is automatically ejected, and a cassette recorder with an autoreverse function. Tape traveling trouble such as wow or flutter can be prevented all the time, and stable operation can be ensured. Handling is simply, and fabrication is easy and inexpensive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
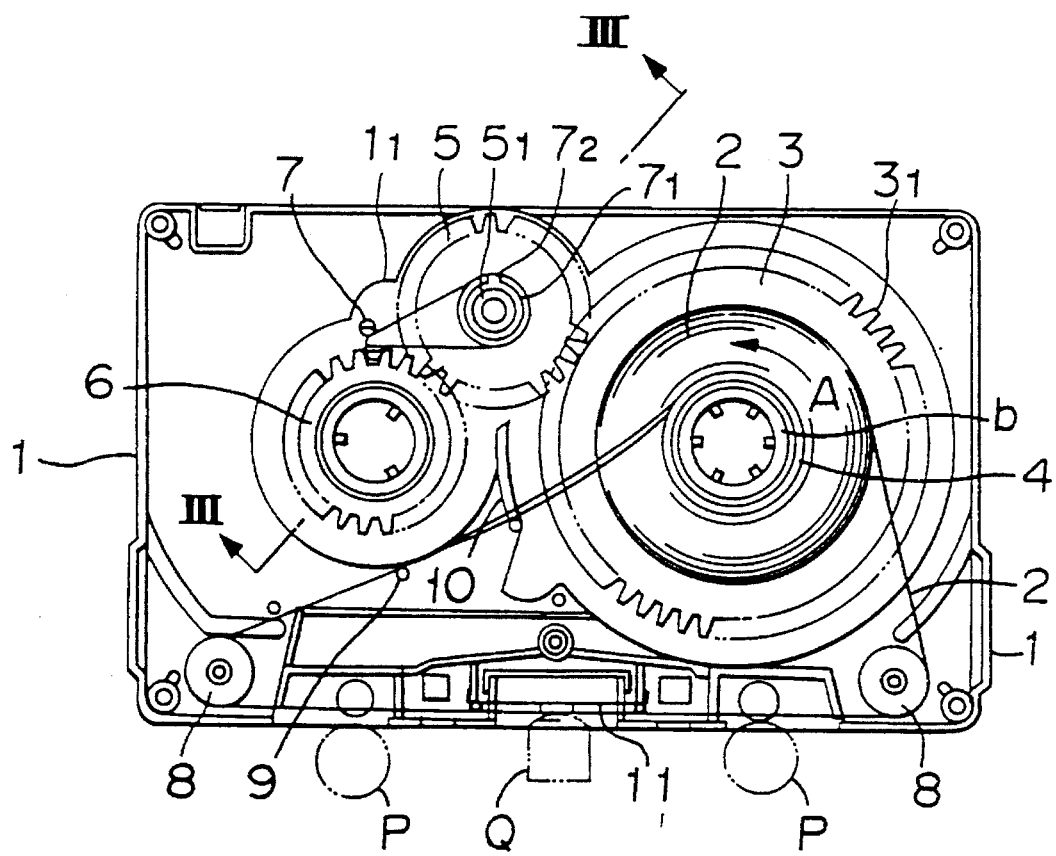
FIG. 1 is a plan view of a first embodiment of the endless-loop tape cassette according to the present invention, wherein an upper cassette half is removed.
Figure 2:
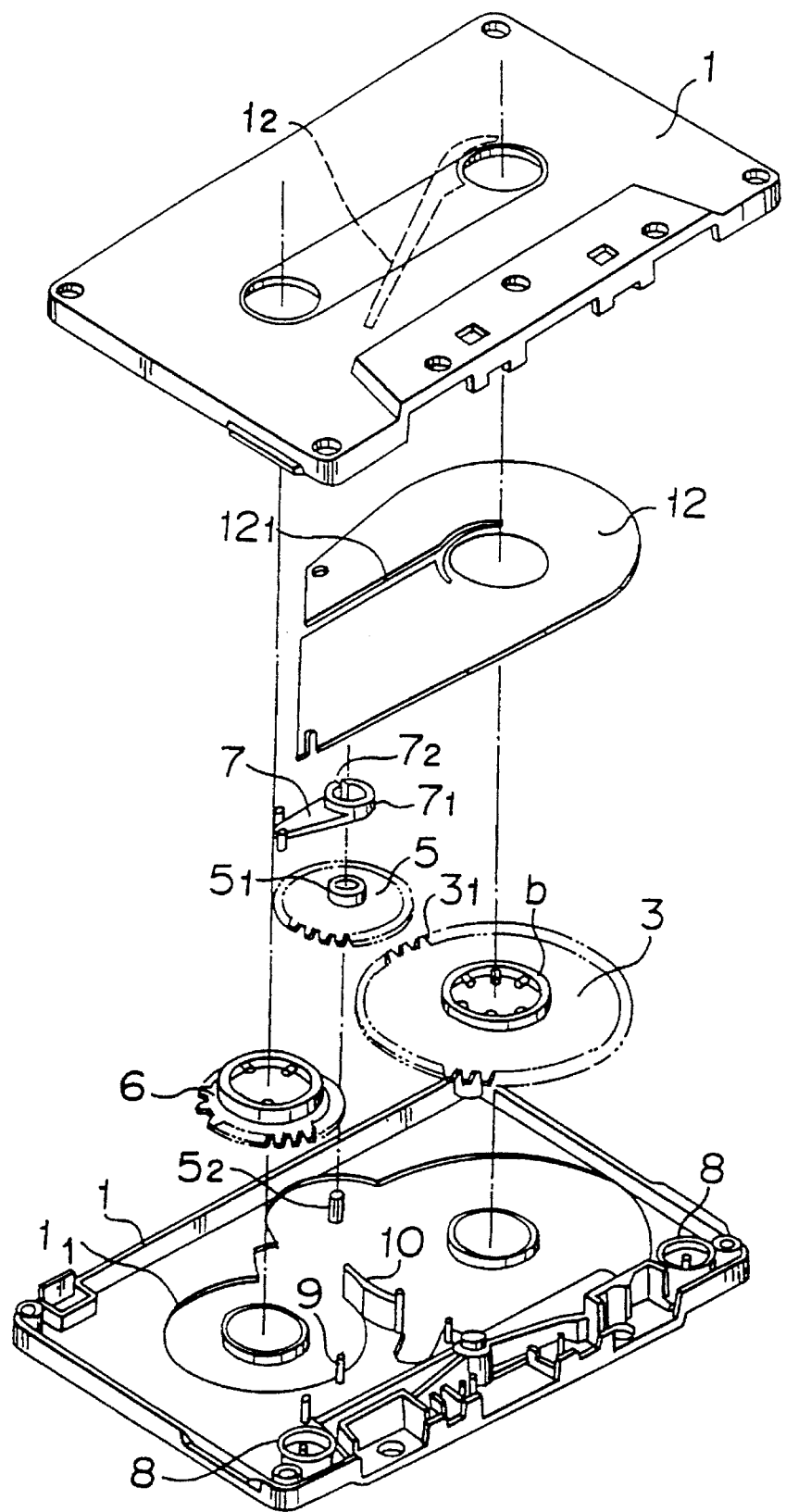
FIG. 2 is a perspective view showing the cassette tape of the first embodiment which is disassembled and has a tape and hubs removed.
Figure 3:
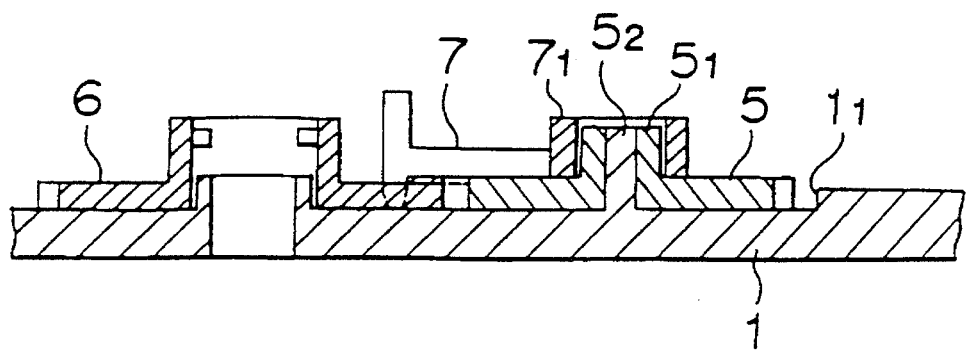
FIG. 3 is a en enlarged longitudinal cross-sectional view taken on line III—III of FIG. 1.

Referring now to FIGS. 1–3, there is shown a first embodiment of the endless-loop tape cassette according to the present invention. The tape cassette of the first embodiment has such a structure that a cassette case 1 is constituted by an upper half case and a lower half case, a tape 2 is wound in a stack around a hub 4 on a disk 3 at a take-up reel shaft side so as to travel in an endless manner, the disk 3 with the tape 2 thereon is provided with a gear $3_1$ on an outer circumference thereof, there is provided an intermediate gear 5 which meshes with the gear $3_1$, there is also provided a hub-shaped annular projection gear 6 which is driven by the intermediate gear 5 to rotate at a supply reel shaft side, and there is further provided a backstop 7 which is engageable with the gear 6.

The hub 4 is fitted on a central annular projection b of the disk 3 so as to be rotatable, and the tape 2 is put on the disk 3 in such a manner that the tape 2 is wound in the stack around the hub 4. Since the disk 3 is constantly rotated by a take-up reel shaft of a cassette recorder (not shown), the wound tape 2 is subjected to a rotational force due to friction in the direction in an arrow A. The tape is drawn out of the inside of the stack by a pinch roller P and a capstan, and rewound to the outside of the stack past a head Q and guide rollers 8 while traveling with a pulling force minimized without being tightly wound.

The intermediate gear 5 has the backstop 7 held on a shaft $5_1$ thereof in a friction-contact state so as to be engageable with the gear 6. For example, a hub portion $7_1$ of the backstop can be formed with a break $7_2$ to obtain the friction connection between the backstop and the intermediate gear so that the backstop rotates along with the intermediate gear 5 until it gets in touch with a recessed wall $1_1$ formed in the case 1, and it undergoes a sliding connection after contacting the recessed wall. When the intermediate gear 5 rotates in the other direction (counterclockwise on the Figures), the backstop comes into engagement with the gear 6. Although the intermediate gear 5 has the same number of teeth as the gear 6 in the embodiment shown, the intermediate gear 5 may have a smaller number of teeth.

The backstop 7 may have such a structure that it is fitted on the gear 6 so as to be engageable with the intermediate gear 5. Anyway, the backstop 7 has such a structure that it is engageable with one of the gear $3_1$, the intermediate gear 5 and the gear 6 for torque transmission in order to obtain a backstop function.

In FIGS. 1–2, reference numeral 9 designates a guide pin and reference numeral 10 designates a guide rib. Reference numeral 11 designates a pad which is arranged at a position opposite to the head Q. Reference numeral 12 designates a liner made of a slip sheet which is interposed between the tape wound stack and the case, and which has a break $12_1$ formed for drawing out the tape. Reference numeral $1_2$ designates a recessed groove for guiding the tape, which is formed in the case. In FIG. 3, reference numeral $5_2$ designates a supporting shaft which projects from the case 1 to support the intermediate gear 5.

When the tape cassette is inserted in a cassette recorder, the cassette recorder operates as if the tape is also held at the supply reel shaft side as well because the rotational force of the hub 4 and disk 3 at the take-up reel side is utilized to rotate the gear 6 at the supply reel shaft side to generate torque at the supply reel shaft side. When an autoreverse function accidentally activates to make the tape travel reversely, the stopper 7 comes into engagement with the gear 6 at the same time as the supply reel shaft changes to the take-up reel shaft. As a result, the tape stops traveling, and the cassette recorder operates as if the tape has completely been wound up, and the tape travel is switched to return to a normal one. In this manner, the reverse travel of the tape can be prevented. The endless-loop tape cassette can be used in any kind of cassette recorders without trouble.

The endless-loop tape cassette according to the present invention can not be used in a tape cassette recorder wherein back tension is mechanically or electrically loaded to the supply reel shaft because when the supply reel shaft side is forced to rotate through the gear from the take-up reel shaft side, the transmission of torque from the take-up reel shaft side to the supply reel shaft side could be difficult. In particular, when the gear ratio of the supply reel shaft side to the take-up reel shaft side is 1:2, one rotation of the take-up reel shaft requires two rotations of the supply reel shaft which is subjected to the back tension. This creates a trouble in that the supply reel shaft fails to rotate following the take-up reel shaft and tape traveling becomes impossible. Second to sixth embodiments can solve this problem.

Figure 4:
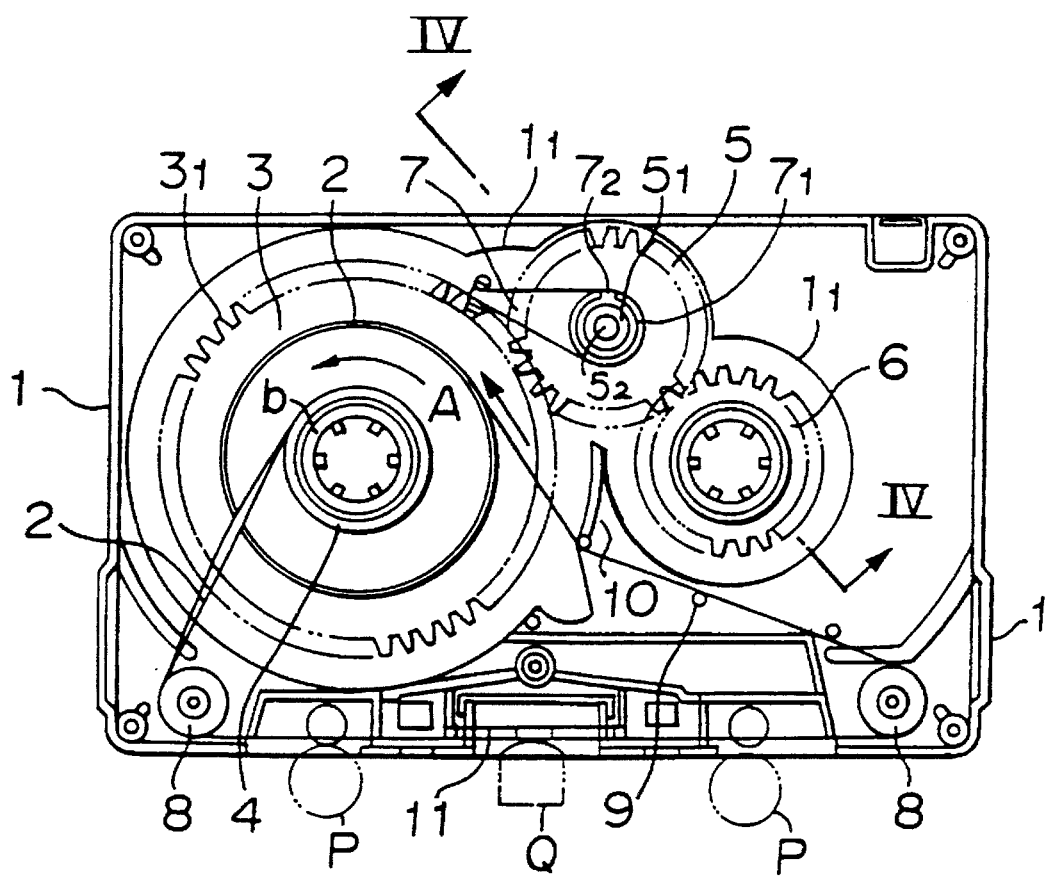
FIG. 4 is a plan view of a second embodiment of the endless-loop tape cassette, wherein an upper cassette half is removed.
Figure 5:
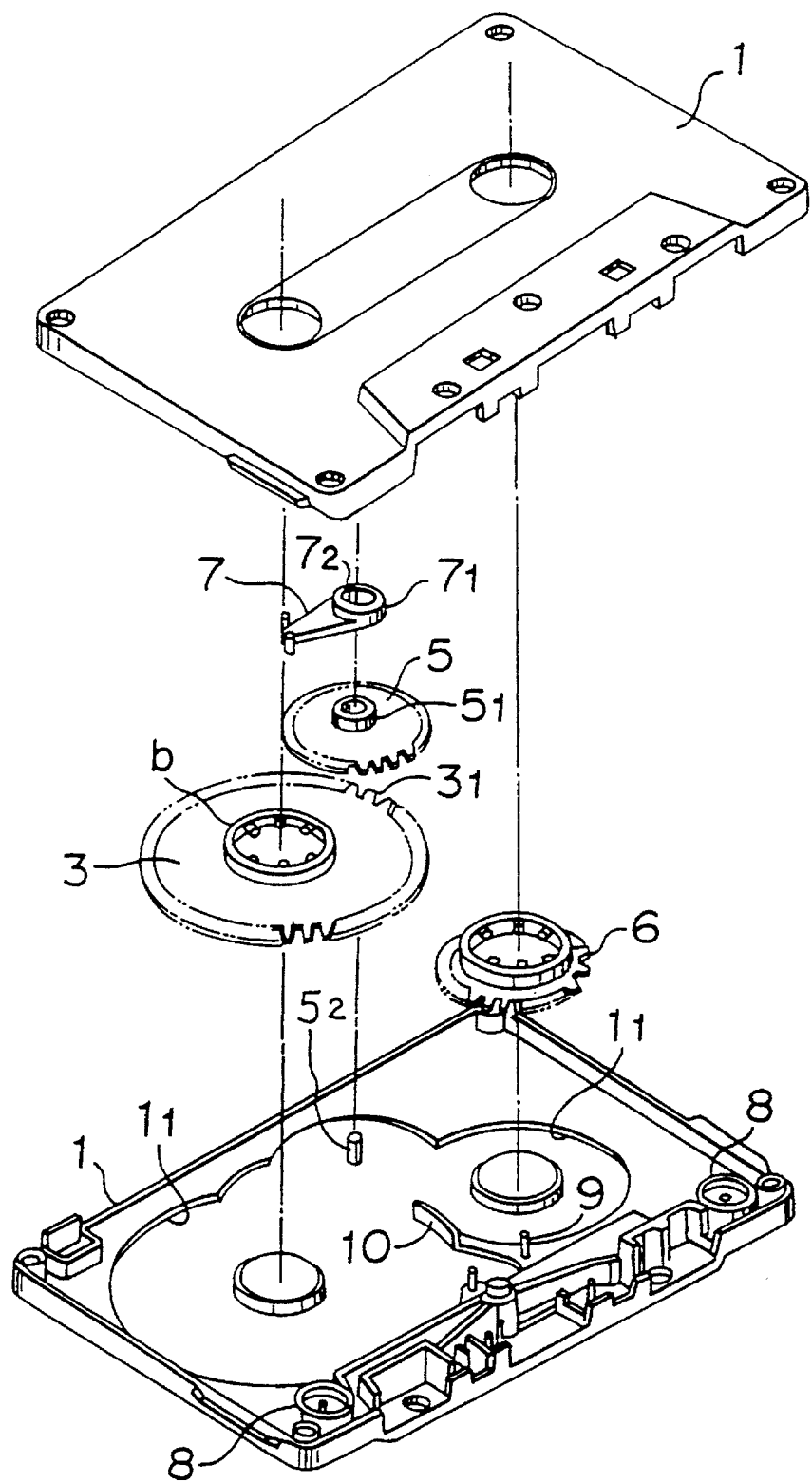
FIG. 5 is a perspective view showing the cassette tape of the second embodiment which is disassembled and has a tape and hubs removed.
Figure 6:
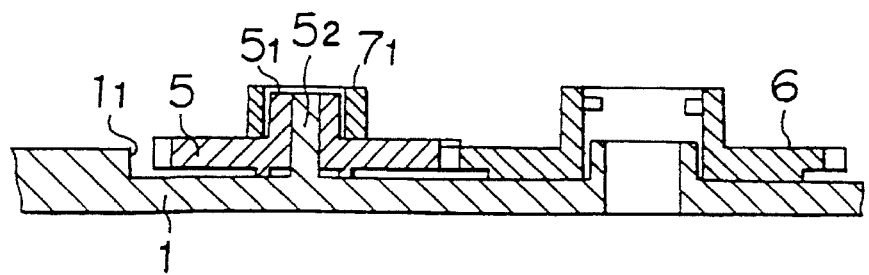
FIG. 6 is an enlarged longitudinal cross-sectional view taken on line IV—IV of FIG. 4.
Figure 7:
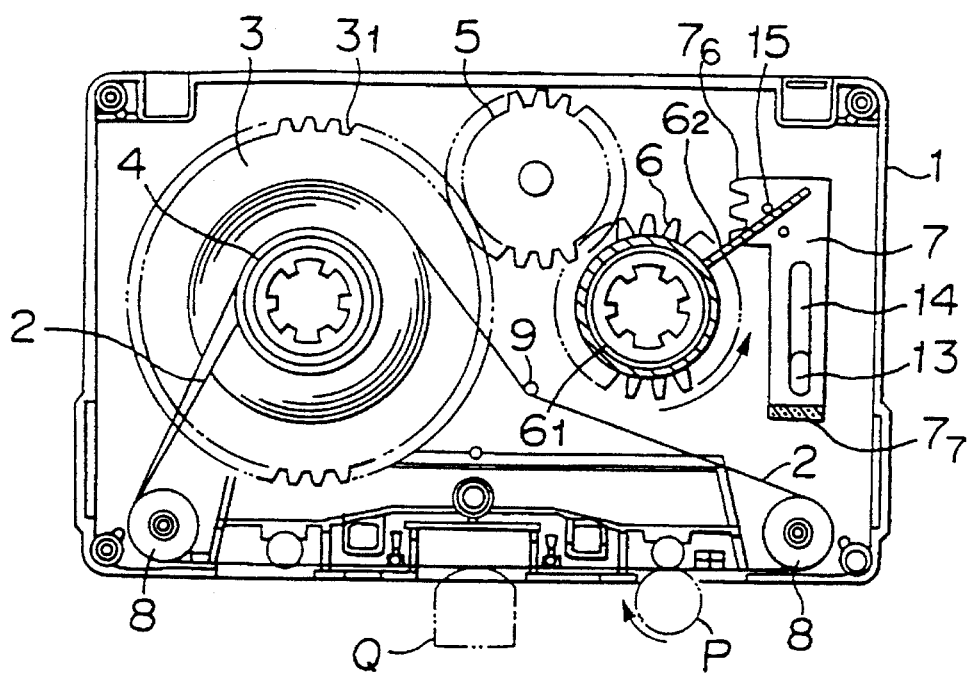
FIG. 7 is a plan view of a third embodiment of the endless-loop tape cassette wherein an upper cassette half is removed.
Figure 8:
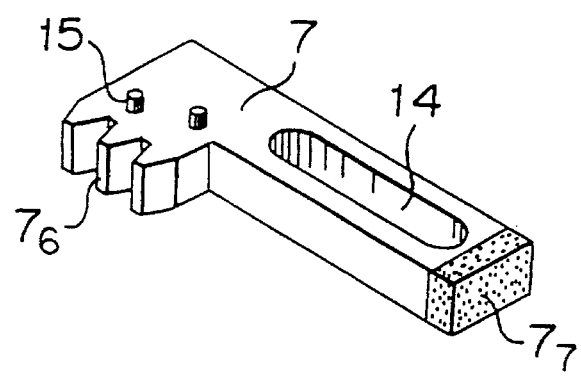
FIG. 8 is an enlarged perspective view of the backstop shown in FIG. 7.
Figure 9A:
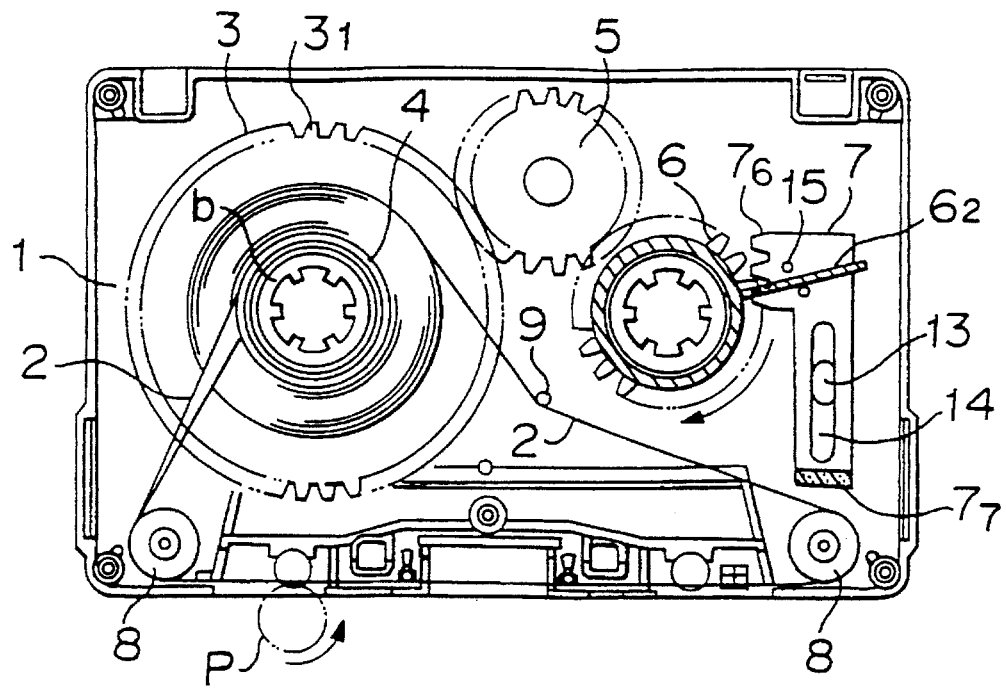
FIGS. 9A and 9B are plan views showing how the third embodiment operates, FIG. 9A showing a state where a reverse rotation starts, and FIG. 9B showing a state where the reverse rotation ends.
Figure 9B:
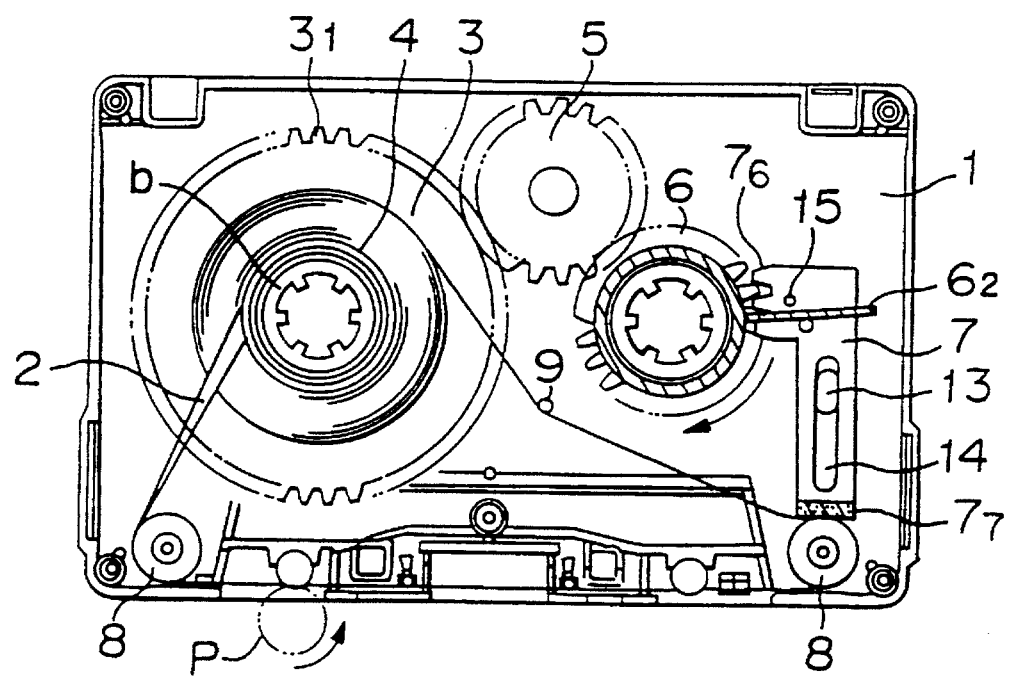

Referring now to FIGS. 4–6, there is shown the second embodiment of the endless-loop tape cassette according to the present invention. The tape cassette of the second embodiment has such a structure that a cassette case 1 is constituted by an upper half case and a lower half case, a tape 2 is wound around a hub 4 on a disk 3 at a supply reel shaft side so as to travel in an endless manner, the disk 3 with the tape put in a stack thereon is provided with a gear $3_1$ on an outer circumference, there is provided a hub-shaped annular projection gear 6 which is driven through an intermediate gear 5 in mesh with the gear $3_1$ to rotate at the take-up reel shaft side, and there is also provided a backstop 7 which is engageable with the gear $3_1$ of the disk 3 at the supply reel shaft side.

Since the disk 3 rotates following the gear 6 which is constantly rotated by the take-up reel shaft of a cassette recorder (not shown), the wound tape 2 is subjected to a rotational force in the direction of an arrow A. The tape is drawn out of the inside of the stack by a pinch roller P and a capstan, and rewound to the outside of the stack past a head Q and guide rollers 8 while traveling with a pulling force minimized without being tightly wound. The intermediate gear 5 has the backstop 7 held on a shaft $5_1$ thereof in a friction-contact state so as to be engageable with the gear $3_1$ of the disk 3. For example, a hub portion $7_1$ of the backstop can be formed with a break $7_2$ to obtain the friction connection between the backstop and the intermediate gear so that the backstop rotates along with the intermediate gear 5 until it gets in touch with an recessed wall $1_1$ formed in the case 1, and it undergoes a sliding connection after contacting the recessed wall. When the intermediate gear 5 rotates in the other direction (counterclockwise on the drawings), the backstop 7 comes into engagement with the gear $3_1$.

In the embodiment shown, the backstop 7 is mounted on the intermediate gear 5. When an autoreverse mechanism activates to make the tape travel reversely, the backstop comes into engagement with the gear $3_1$ at the supply reel shaft side to stop the rotation of the gear 6. As a result, the cassette recorder operates as if the tape has completely been wound up, and the tape travel is switched to return to a normal one (the A side travel), thereby preventing reverse travel. The backstop 7 may have such a structure that it is engageable with the gear 6 or the intermediate gear 5. Anyway, the backstop can prevent reverse travel by having such a structure that it is engageable with one of the gear $3_1$, the intermediate gear 5 and the gear 6 for torque transmission.

The intermediate gear 5 is a transmission gear, and is arranged to be balanced against the gears 6 and $3_1$ at the take-up reel shaft side and at the supply reel shaft side. Even if the supply reel shaft side is subjected to back tension, a rotational force can be smoothly transmitted from the take-up reel shaft side to the disk 3. As a result, mechanical noise in gear driving can decrease, and the tape cassette can be used when take-up reel shaft torque is small, being applicable to any kind of cassette recorder.

In the first and second embodiments, even if the backstop has stopped hub rotation, the capstan of the cassette recorder continues to rotate. This creates a problem in that the tape is still reeled out, and it is difficult to handle in a hand-held type cassette player and a cassette player on vehicle wherein it is difficult to see which side of the tape is about to be played. A third to sixth embodiments can solve this problem.

Referring now to FIGS. 7–9B, there is shown the third embodiment of the endless-loop tape cassette according to the present invention. The tape cassette of the third embodiment has such a structure that an annular projection $6_1$ of a gear 6 at the take-up reel shaft side has a supporter for a stopper operating member $6_2$ carried thereon so that the supporter is rotatable in friction-contact with the annular projection $6_1$, and the stopper operating member $6_2$ is engaged with a stopper 7 having an engagement portion $7_6$ and a tape pressing portion $7_7$.

The stopper operating member $6_2$ can be formed from an engagement piece which projects from a cylindrical body as the supporter which is friction-fitted on the annular projection $6_1$ of the take-up reel shaft side gear 6. The gear 6 can rotate in the cylindrical body while being in friction-contact therewith. Such an arrangement allows the stopper operating member $6_2$ to change the operating direction to the stopper 7 according to the rotational direction of the gear 6. The stopper 7 which is engaged with the engagement piece can be slid along a guide pin 13 which is fitted in an elongated groove 14.

The stopper 7 includes the engagement portion $7_6$ engageable the gear 6 and the tape pressing portion $7_7$ which can be in touch with a traveling tape 2 and is made of a material having a high coefficient of friction. The stopper 7 is mounted to a case 1 so as to be slidable.

Although an intermediate gear 5 has the same number of teeth as the gear 6 at the take-up reel shaft side in the embodiment shown, the intermediate gear can have a smaller number of teeth.

The stopper 7 for backstop is arranged on the take-up reel shaft side. When an autoreverse mechanism activates to make the tape travel reversely, the engagement portion $7_6$ comes into engagement with the gear 6 through the stopper operating member $6_2$ to stop the gear 6, and the pressing portion $7_7$ holds the tape 2 on a guide roller 8 (see FIGS. 9A and 9B). As a result, a cassette recorder operates as if the tape has completely been wound up, and tape travel is switched to return to a normal one (to the A side travel), thereby preventing the tape from traveling reversely. The engagement portion $7_6$ of the stopper 7 can have such a structure that it is engageable with a disk gear $3_1$ or the intermediate gear 5. Anyway, the stopper can prevent the reverse travel by having such a structure that it is engageable with one of the gears $3_1$, 5 and 6 for transmission.

In FIGS. 7–9B, reference numeral 15 designates an engagement pin which projects from the stopper 7. Reference numeral 9 designates a guide pin which projects from the case 1.

Figure 10:
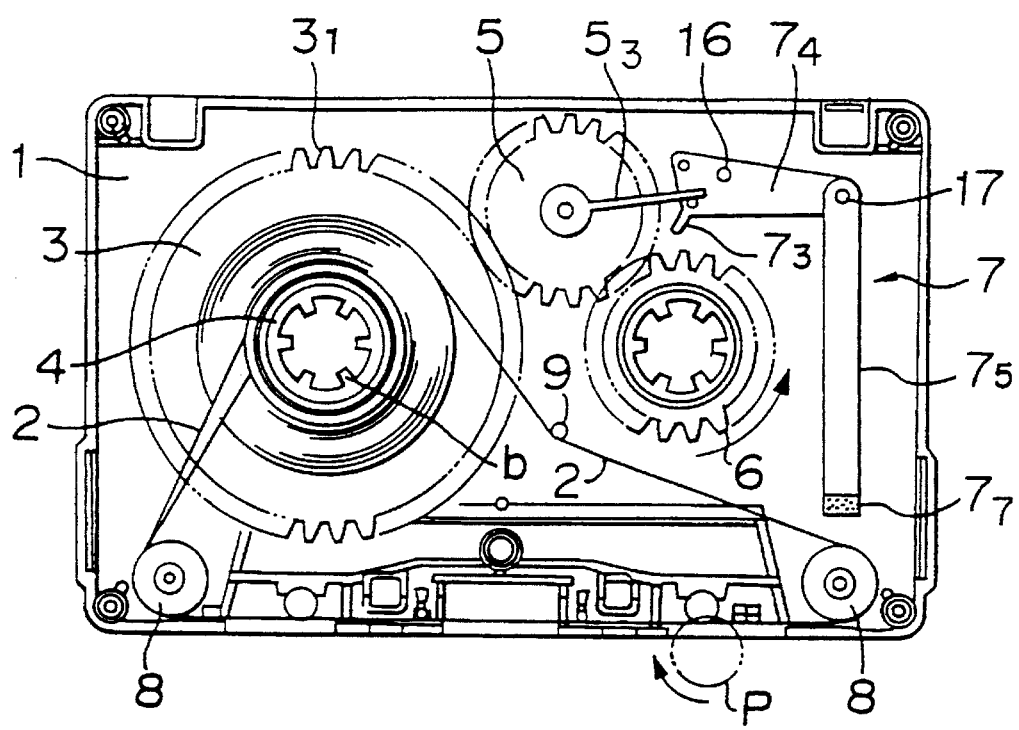
FIG. 10 is plan view of a fourth embodiment of the endless-loop tape cassette wherein an upper cassette half is removed.
Figure 11A:
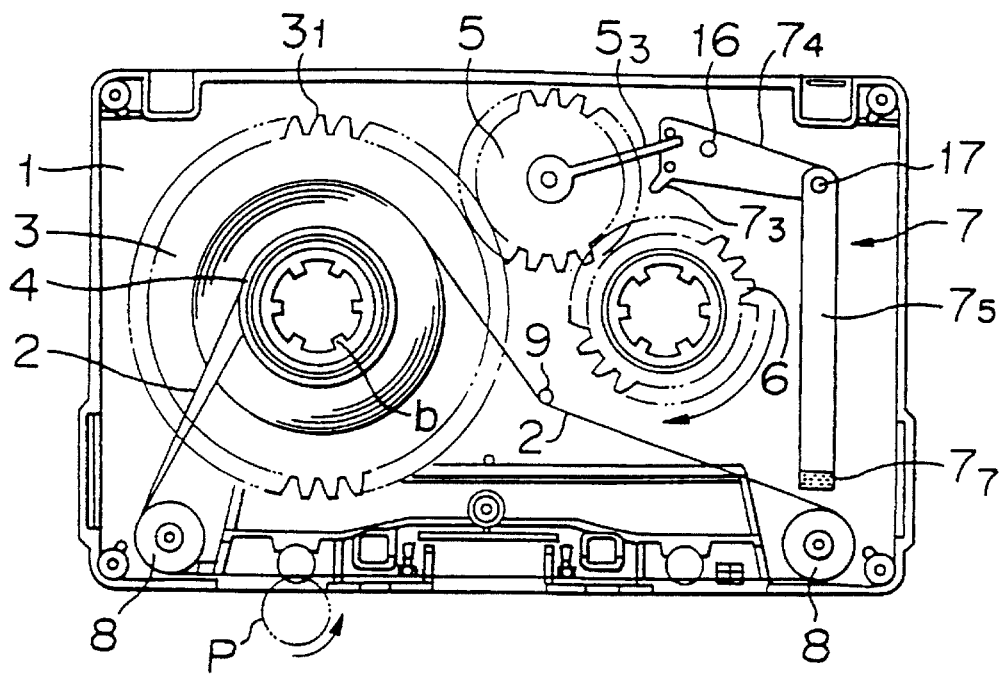
FIGS. 11A and 11B are plan views showing how the fourth embodiment operates, FIG. 11A showing a state where a reverse rotation starts, and FIG. 11B showing a state where the reverse rotation ends.
Figure 11B:
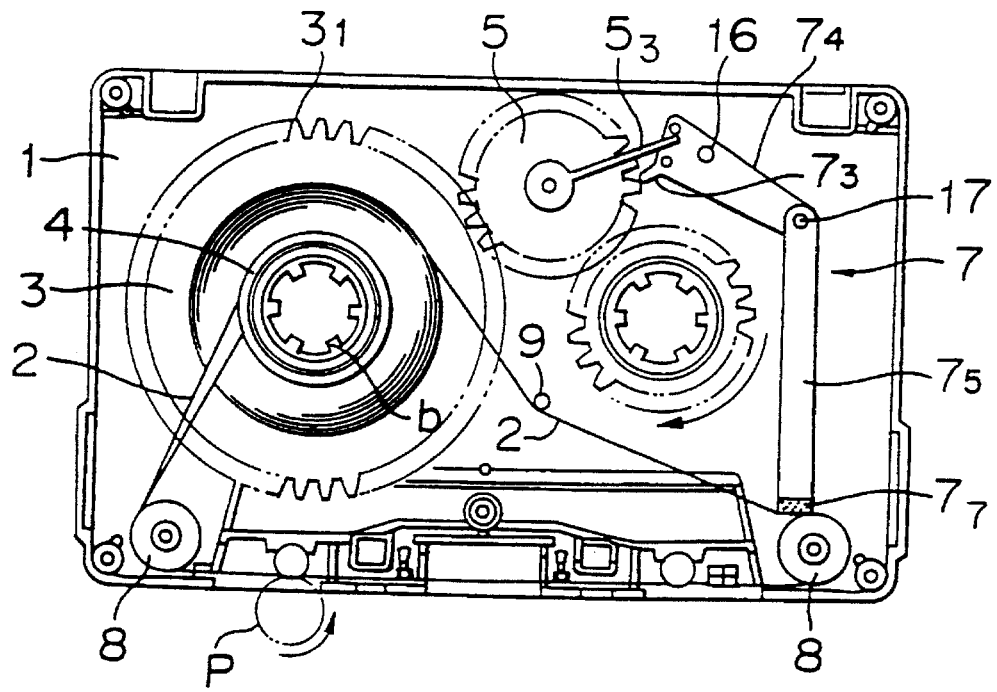
Figure 12:
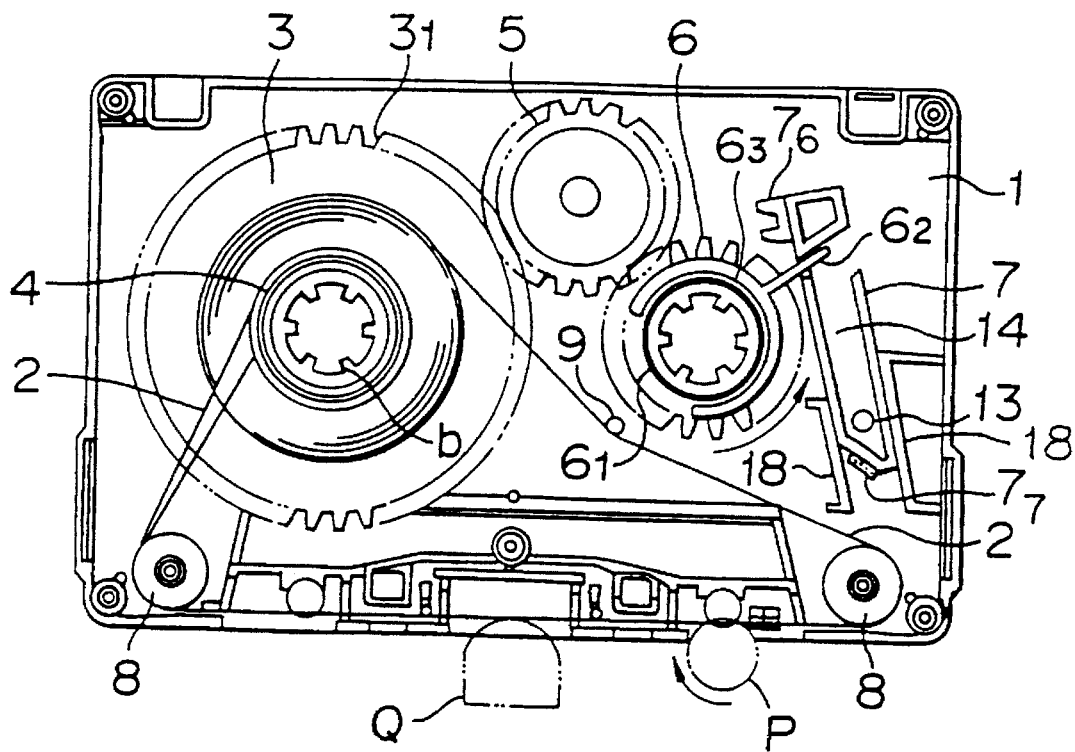
FIG. 12 is a plan view of a fifth embodiment of the endless-loop tape cassette wherein an upper cassette half is removed.
Figure 13:
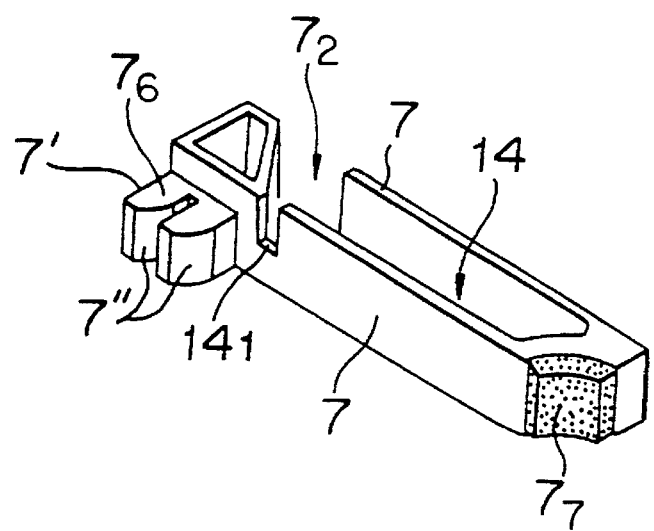
FIG. 13 is an enlarged perspective view of the backstop shown in FIG. 12.
Figure 14:
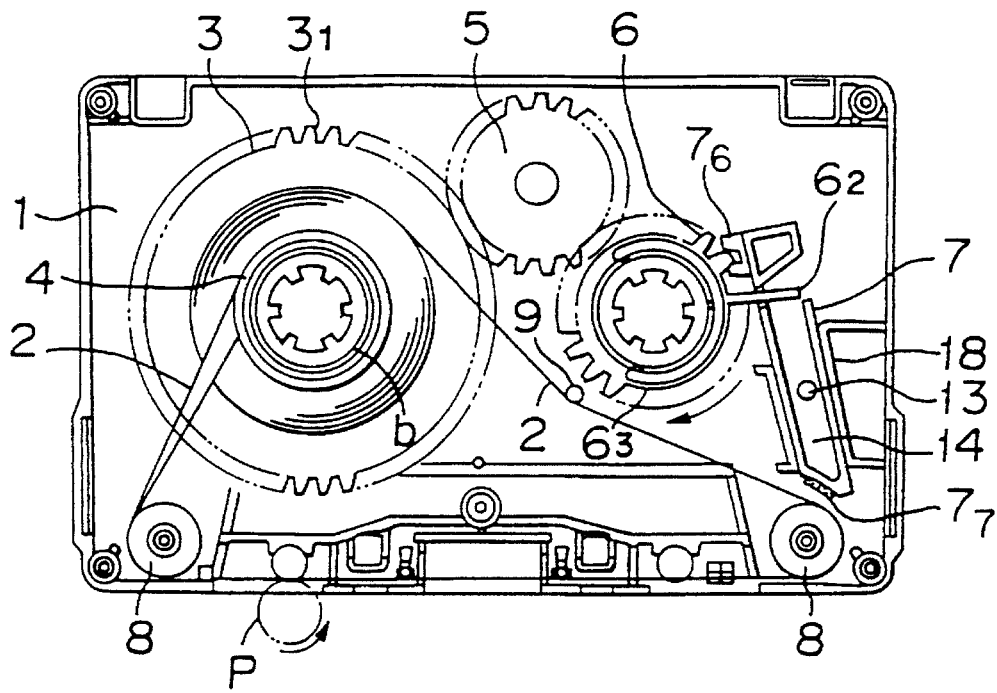
FIGS. 14A and 14B are plan views showing how the fifth embodiment operates, FIG. 14A showing a state where a reverse rotation starts, FIG. 14B showing a state where the reverse rotation ends.
Figure 14:
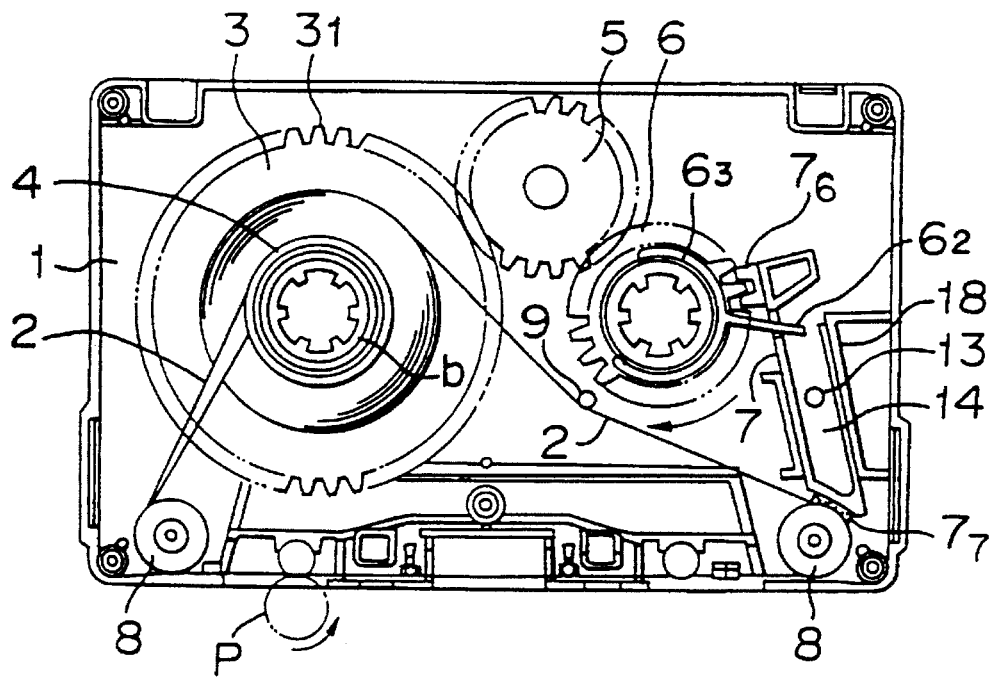

Referring now to FIGS. 10–11B, there is shown the fourth embodiment. The tape cassette of the fourth embodiment has such a structure that a stopper operating member $5_3$ is friction-fitted on a shaft of an intermediate gear 5 through a cylindrical body as a supporter so as to be coaxial therewith, a stopper 7 includes a projection $7_3$ which is engageable with the intermediate gear 5 and the stopper 7 is constituted by a link $7_4$ pivoted on a case 1 through a shaft 16, and a lever $7_5$ having one end rotatably coupled to the link $7_4$ (via pivot 17) and the other end provided with a tape pressing portion $7_7$. Such a structure allows a tape 2 to be held on a guide roller 8 as the same time as the intermediate gear 5 stops, thereby preventing the tape from being still reeled out and from traveling reversely.

Referring now to FIGS. 12–14B, there is shown the fifth embodiment according to the present invention. The endless-loop tape cassette of the fifth embodiment has such a structure that a gear 6 at the take-up reel side has an annular projection $6_1$, a friction operating member $6_3$ as a supporter which has a stopper operating member $6_2$ projected therefrom is frictionally carried on the annular projection $6_1$ to be coaxial therewith, a stopper 7 which has one end provided with an engagement portion $7_6$ engageable with the gear 6 and the other end provided with a tape pressing portion $7_7$ is arranged in a case 1 to be slidable along a guide pin 13 and guide ribs 18, and the stopper 7 has an engagement notch $14_1$ cooperated with the stopper operating member $6_2$.

Figure 15:
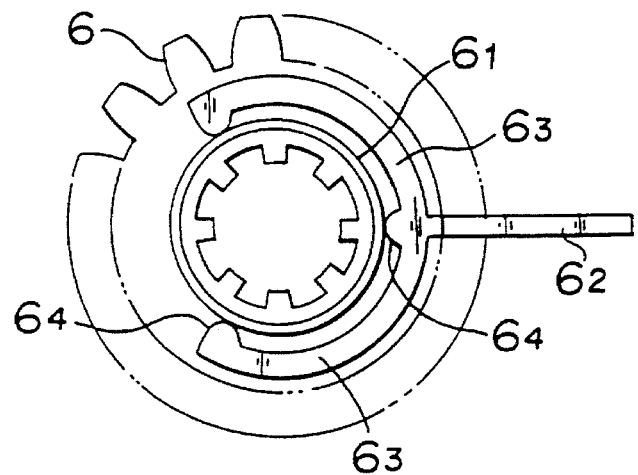
FIG. 15 is a plan view of the backstop operating member shown in FIG. 12.
Figure 16:
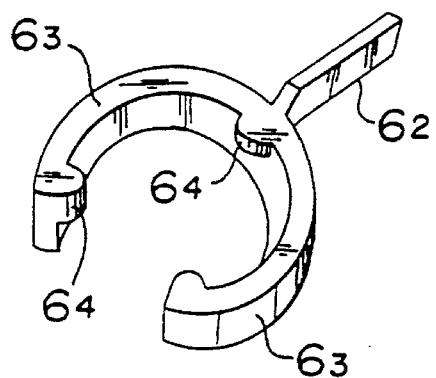
FIG. 16 is a perspective view of the supporter shown in FIG. 15.

The friction operating member $6_3$ is a frame which is U-shaped or horseshoe-shaped along the outer circumference of the annular projection $6_1$ and has opposite ends opened as shown in FIGS. 15 and 16. And the frame has such a structure that it has a plurality of projections $6_4$, e.g. three projections, formed at intervals on the inner circumference thereof, and the frame is in touch with the outer circumference of the annular projection $6_1$ at the locations of the projections so as to be friction-fitted thereon. Such a structure offers an open shape, and can transmit appropriate torque without requiring a high degree of dimensional accuracy. Even if the diameter of the annular projection is small, the torque does not become significantly great. The take-up reel gear 6 can rotate with respect to the frame in friction-contact therewith. As a result, the operating direction of the stopper operating member $6_2$ is changed according to the rotational direction of the gear 6. The stopper 7 which is coupled to the stopper operating member $6_2$ can be slidably moved along the guide pin 13 in the elongated groove 14 and the guide ribs 18.

Figure 17:
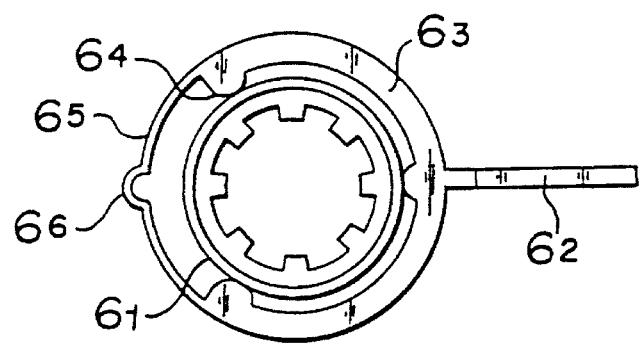
FIG. 17 is a plan of another example of the backstop operating member.
Figure 18:
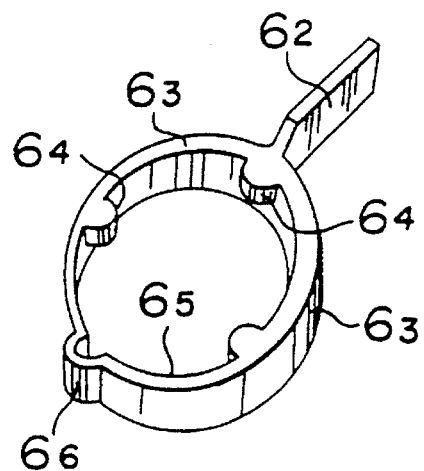
FIG. 18 is a perspective view of the backstop operating member shown in FIG. 17.

As shown in FIGS. 17 and 18, the friction operating member $6_3$ can have such a structure that it has a closed shape instead of the open shape so as to have a thin-walled portion $6_5$ to form an endless annular frame, the frame is in contact in the annular projection $6_1$ at the projections $6_4$, and the thin-walled portion $6_5$ has a deformation-absorbing portion $6_6$. Such a structure does not require a high degree of dimensional accuracy in fabrication, and can obtain appropriate torque like the case just stated above. In addition, size control becomes easier because of adaption of the closed shape.

The stopper 7 includes the engagement portion $7_6$ engageable with the take-up reel gear 6 and the tape pressing portion $7_7$ which can be in touch with a traveling tape 2 and is made of a material having a high coefficient of friction. The stopper is arranged in the case 1 so as to be slidable along the guide pin 13 and guide ribs 18 and which project from the case 1, and the stopper has the elongated groove 14 therein to receive the guide pin 13.

Specifically, the stopper 7 is a substantial C-shaped arm which has the engagement portion $7_6$ on the top, and includes a break $7_2$ and the elongated groove 14. Even if the engagement portion $7_6$ of the stopper 7 has teeth collided against the teeth of the take-up reel gear which is rotating counterclockwise on the figures, the engagement portion can shift due to flexibility to obtain good engagement between the teeth and grooves of both members, thereby allowing the tape to travel.

Figure 19:
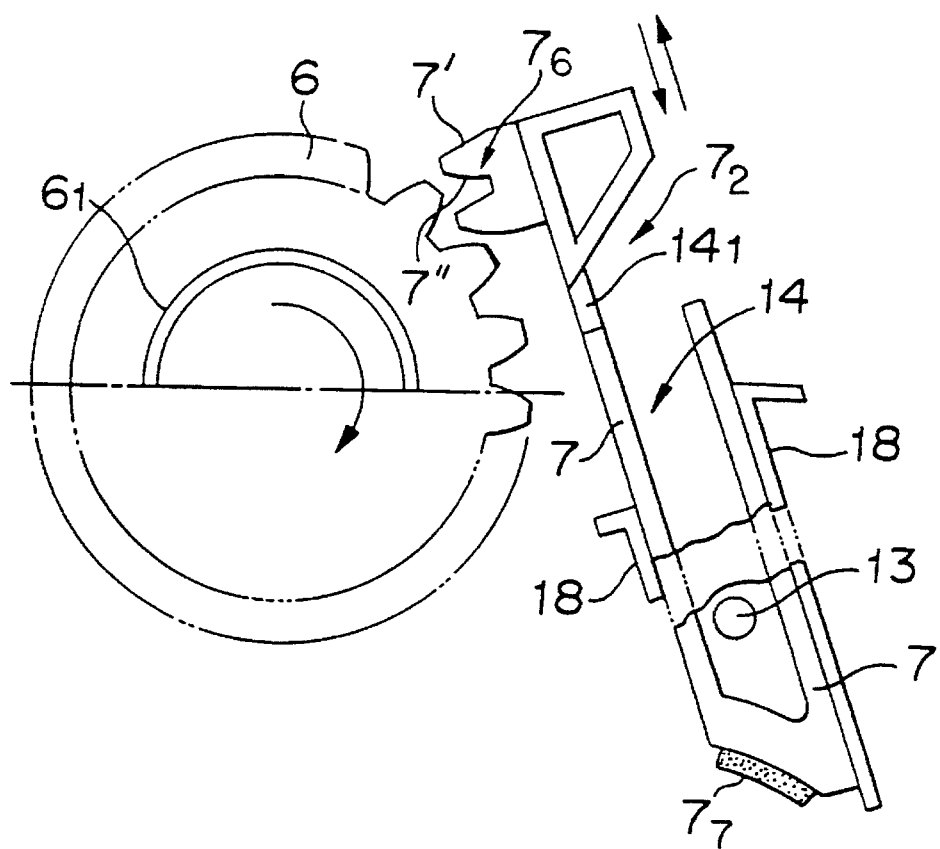
FIG. 19 is an enlarged plan view of the backstop shown in FIG. 12.

The engagement portion $7_6$ of the stopper 7 is a toothed portion so that as shown in FIG. 19 where a headhouse of the case is directed downward, upper surfaces orthogonal to the slide direction of the stopper 7 are flat surfaces 7' and lower surfaces orthogonal to the sliding direction are curved surfaces 7" so as to be engageable with the take-up reel gear 6. When the teeth of both members collide against each other, they can easily shift to obtain suitable movement with a light force without seizure therebetween. In addition, the upper surfaces of the teeth are the flat surfaces orthogonal to the sliding direction, and the stopper 7 cannot be disengaged from the take-up reel gear 6 at high speed rewinding, ensuring suitable operation.

The tape pressing portion $7_7$ of the stopper 7 has an arc shape, a slant shape or a wedge-like shape along the outer circumference of the tape guide roller 8 so that when the stopper 7 slides downward to stop the tape, the tape pressing portion can work as it wedges between the guide roller 8 and the guide rib 18. The tape pressing portion can be made of a material having a high coefficient of friction, e.g. a rubber material or a sponge material, and is arranged to get in touch with and go apart from the guide roller 8. When the tape pressing portion is pressed against the traveling tape, i.e. the stopper slides to the tape to press the tape, the tape can be strongly stopped.

Figure 20:
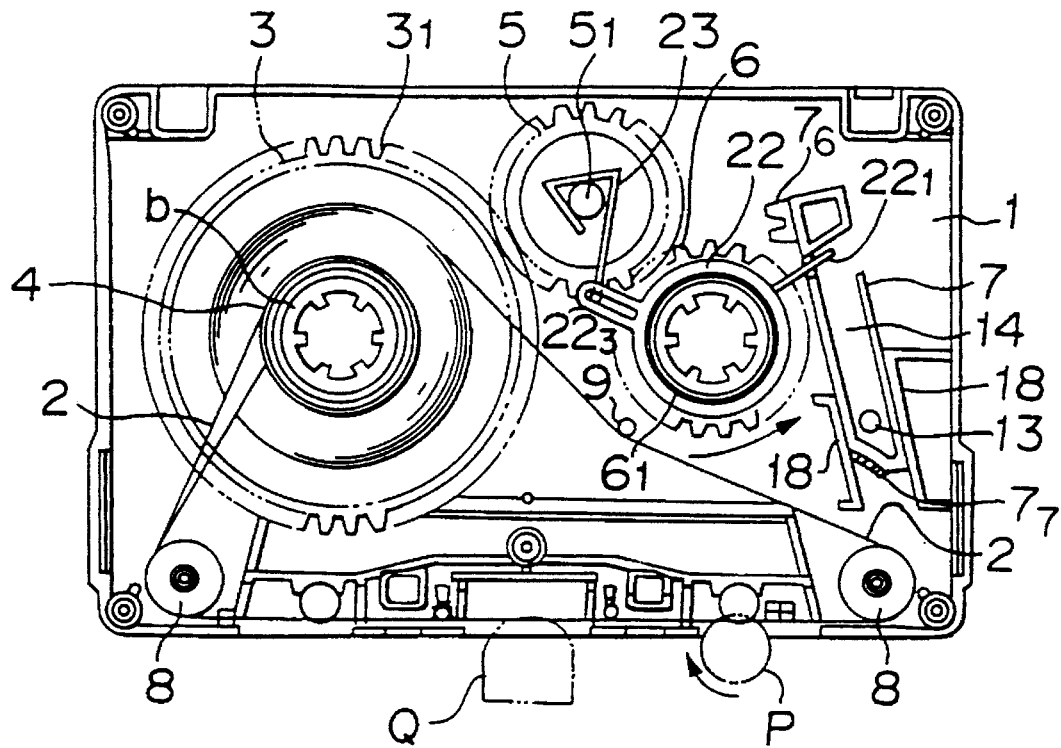
FIG. 20 is a plan view of a sixth embodiment of the endless-loop tape cassette wherein an upper cassette half is removed.
Figure 21:
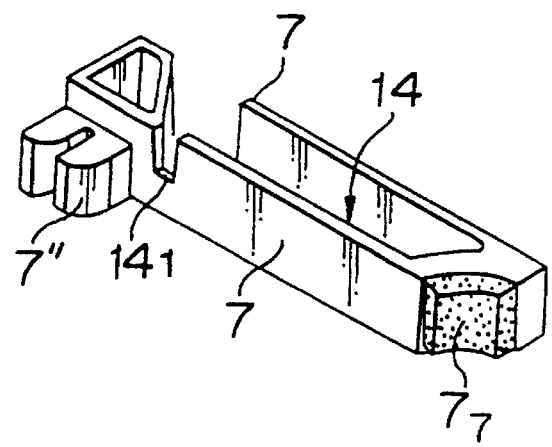
FIG. 21 is an enlarged perspective view of the backstop shown in FIG. 20.
Figure 22:
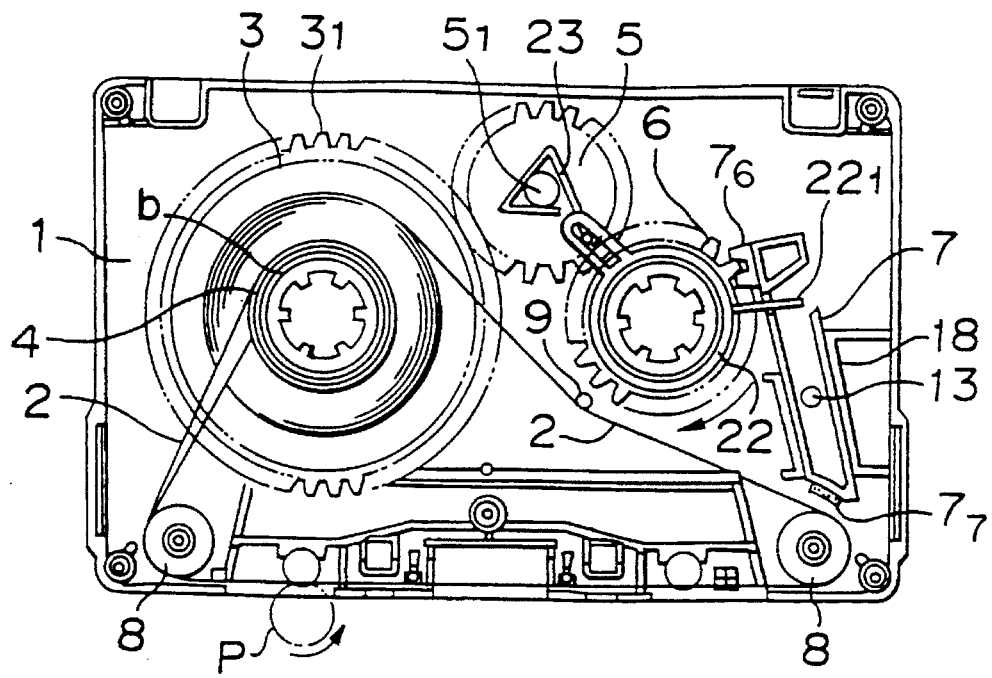
FIGS. 22A and 22B are plan views showing how the sixth embodiment operates, FIG. 22A showing a state where a reverse rotation starts, and FIG. 22B showing a state where the reverse rotation ends.
Figure 22:
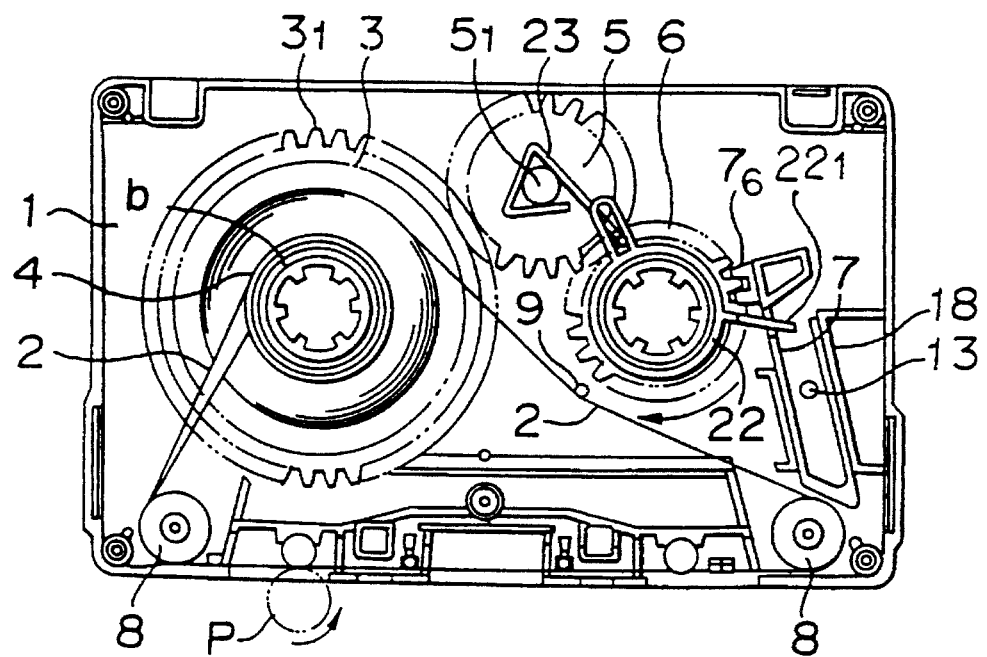

Referring now to FIGS. 20–22, there is shown the sixth embodiment according to the present invention. The tape cassette of the sixth embodiment has such a structure that a take-up reel gear 6 has an annular projection $6_1$, an operating member 22 as a supporter which has a stopper operating member $22_1$ and an engagement lever $22_3$ projected therefrom is carried on the annular projection $6_1$ in an idle manner so as to be coaxial therewith, a cooperating member 23 has one end engaged with the engagement lever $22_3$ and the other end held on a shaft $5_1$ of an intermediate gear 5 in friction-contact, a stopper 7 which has one end provided with an engagement portion $7_6$ engageable with the take-up reel gear 6 and the other end provided with a tape pressing portion $7_7$ is arranged in a case 1 so as to be slidable along a guide pin 13 and guide ribs 18, and the operating member 22 is associated with the stopper 7 by inserting the stopper operating member $22_1$ in an engagement notch $14_1$ of the stopper 7.

Figure 23:
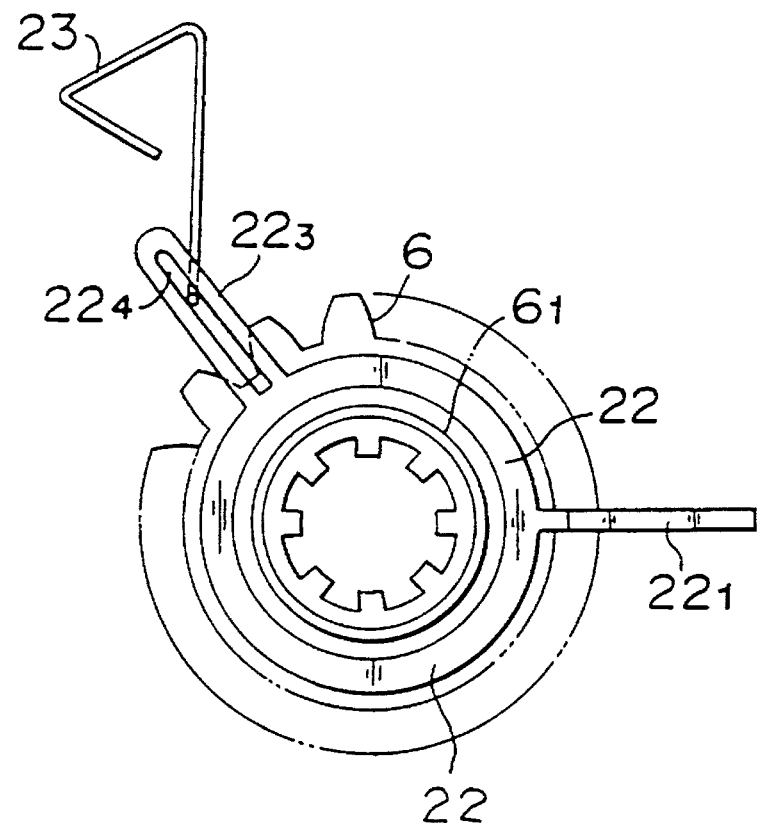
FIG. 23 is a plan view of the cooperating member shown in FIG. 20.
Figure 24:
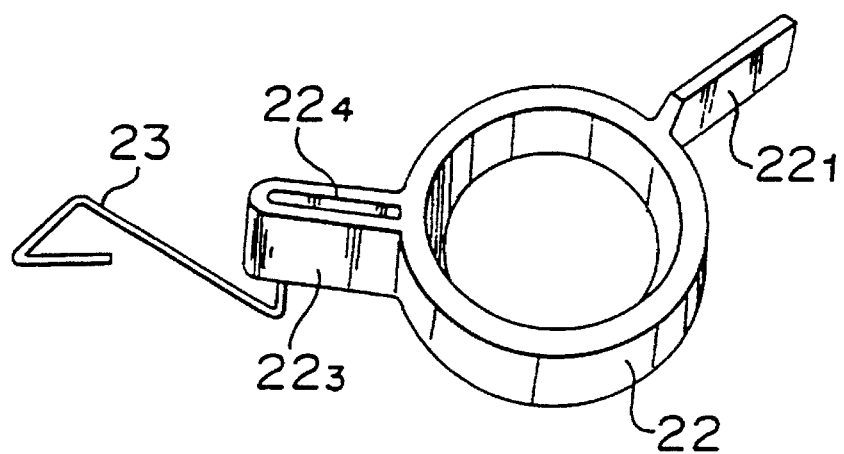
FIG. 24 is a perspective view of the cooperating member shown in FIG. 23.
Figure 25:
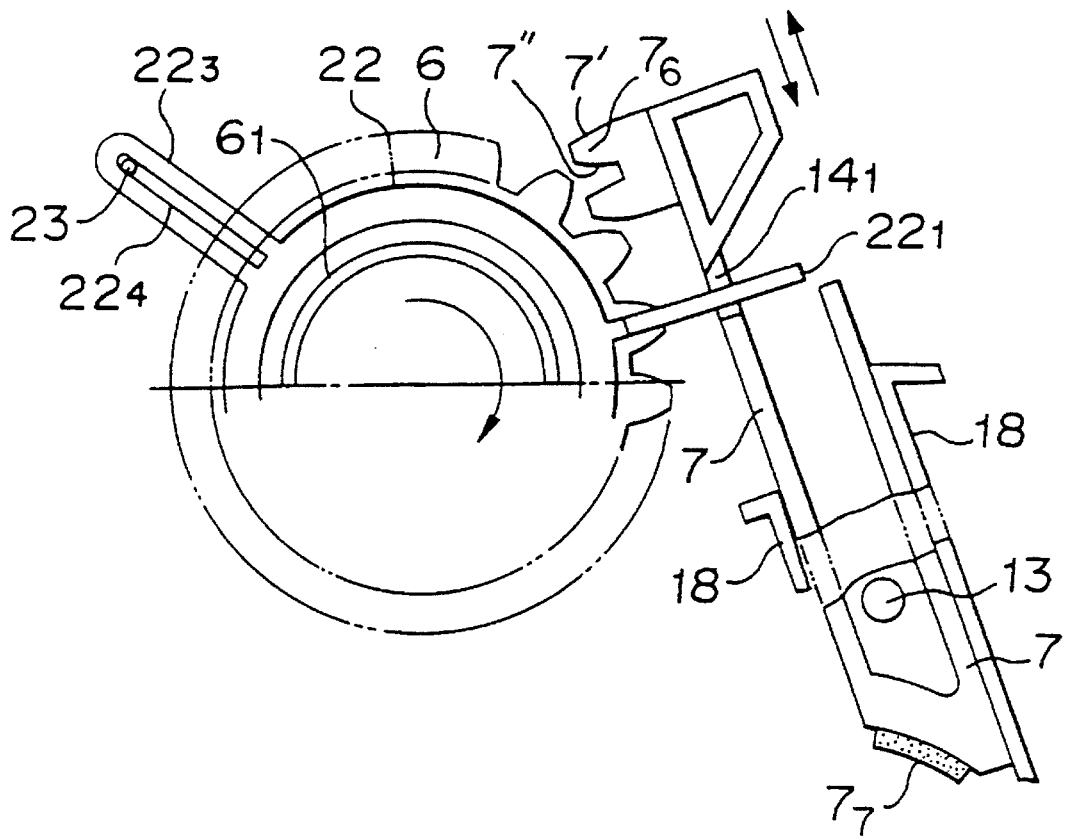
FIG. 25 is an enlarged plan view of the backstop shown in FIG. 20.
Figure 26:
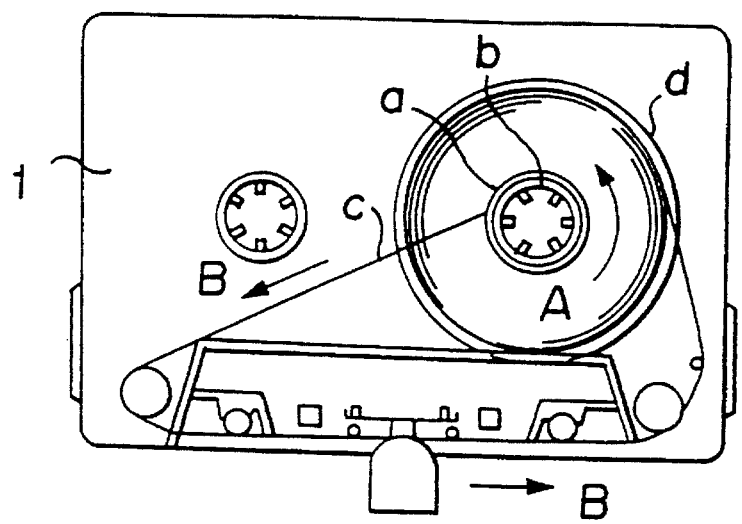
FIG. 26 is a plan view of a conventional endless-loop tape cassette wherein an upper cassette half is removed.

As shown in FIGS. 23 and 24, the operating member 22 is a cylindrical body which is carried on the annular projection $6_1$ of the take-up reel gear 6 in an idle manner, and which has the stopper operating member $22_1$ and the engagement lever $22_3$ with an engagement hole $22_4$ individually projected from the outer circumference thereof. Because the cylindrical body is idle with respect to the take-up reel gear, torque can not be increased, and appropriate torque can be transmitted without requiring a high degree of dimensional accuracy. The cylindrical body constantly rotates in such an idle manner with respect to the take-up reel gear 6, and the cooperating member 23 which rotates along with the shaft $5_2$ of the intermediate gear 5 only by friction can change the operational direction of the stopper operating member $22_1$. The stopper operating member $22_1$ is coupled to the stopper 7, and the stopper 7 is operated along the guide pin 13 in an elongated groove 14 in the stopper and the guide ribs 18 by the stopper operating member $22_1$.

The cooperating member 23 is made of a wire which has one end wound on the shaft $5_1$ of the intermediate gear 5 and the other end bent and held in the engagement hole $22_4$ of the engagement lever $22_3$ formed on the operating member 22. Such an arrangement can obtain a wide range of freedom in designing parts, it is not necessary to make dimensional control strict, and the structure is simple to realize inexpensive fabrication.

In accordance with the sixth embodiment, the reels start reverse rotation accidentally, the cooperating member 23 which is carried on the intermediate gear 5 in the friction manner activates the operating member 22 and the stopper operating member $22_1$ to slide the stopper 7.

Because the cooperating member 23 is held on the shaft $5_1$ of the intermediate gear 5 to be coaxial therewith in the sixth embodiment, the movement of the intermediate gear is transmitted from the cooperating member 23 to the operating member 22 through the engagement lever $22_3$ to rotate the operating member 22 around the annular projection $6_1$. The shaft of the intermediate gear 5 which moves the stopper 7 through the stopper operating member $22_1$ can be formed to be relatively thin, and prevent torque from increasing in comparison with a friction force. The tape cassette can be used in a cassette deck which has small take-up torque, and can easily control a friction force between the intermediate gear and the cooperating member. An excessively high degree of dimensional control is not required, and the tape cassette can be used without becoming a defective product due to deterioration with age.

What is claimed is:

1. An endless-loop tape cassette comprising:
   an endless-loop magnetic tape;
   a disk which has a portion of the magnetic tape wound in a stack thereon, and which is rotatable along with one of a supply reel shaft and a take-up reel shaft;
   a rotating member which is rotatable along with the other one of the supply reel shaft and the take-up reel shaft;
   a transmission mechanism which comprises a gear and which transmits a rotary movement between the disk and the rotating member; and
   a backstop which is movable between an engaged position and a disengaged position, wherein in said engaged position said backstop engages at least one of the disk, the rotating member and the transmission mechanism to oppose rotation of said at least one of the disk, the rotating member and the transmission mechanism, and wherein said backstop moves from said disengaged position to said engaged position in response to a change in direction of rotation of at least one of the disk, the rotating member and the transmission mechanism.

2. An endless-loop tape cassette according to claim 1, wherein the disk is rotatable along with the supply reel shaft.

3. An endless-loop tape cassette according to claim 1, wherein the disk has an outer circumference provided with a gear.

4. An endless-loop tape cassette according to claim 1, wherein the backstop comprises a link and a lever, the link having one end engageable with the transmission mechanism and being supported by a cassette half, the lever having one end rotatably coupled to the link and another end provided with a tape pressing portion.

5. An endless-loop tape cassette according to claim 1, wherein the rotating member comprises a hub-shaped annular projection gear.

6. An endless-loop tape cassette according to claim 1, wherein one of the rotating member and the transmission mechanism coaxially supports a supporter with a stopper operating member so as to be rotatable in a friction-contact state.

7. An endless-loop tape cassette comprising:
   an endless-loop magnetic tape;
   a disk which has a portion of the magnetic tape wound in a stack thereon, and which is rotatable along with one of a supply reel shaft and a take-up reel shaft;
   a rotating member which is rotatable along with the other one of the supply reel shaft and the take-up reel shaft;
   a transmission mechanism which transmits a rotary movement between the disk and the rotating member; and
   a backstop which is movable between an engaged position and a disengaged position, wherein in said engaged position said backstop engages at least one of the disk, the rotating member and the transmission mechanism to oppose rotation of said at least one of the disk, the rotating member and the transmission mechanism, and wherein said backstop moves from said disengaged position to said engaged position in response to a change in direction of rotation of at least one of the disk, the rotating member and the transmission mechanism;
   wherein the backstop comprises an engagement portion and a tape pressing portion, and wherein in the engaged position of said backstop the engagement portion engages one of the disk, the rotating member and the transmission mechanism to stop rotary movement thereof.

8. An endless-loop tape cassette according to claim 7, wherein the engagement portion is provided with a projection.

9. An endless-loop tape cassette according to claim 7, wherein the pressing portion includes a material having a high coefficient of friction.

10. An endless-loop tape cassette according to claim 7, wherein the engagement portion of the backstop comprises a tooth formation which has an upper surface which is flat and which is orthogonal to a sliding direction of the backstop, and a lower surface which is curved.

11. An endless-loop tape cassette according to claim 7, wherein the backstop is slidable along a guide rib on a cassette half.

12. An endless-loop tape cassette according to claim 7, wherein the tape pressing portion is in one of an arc shape and a wedge-like shape along an outer circumference of a tape guide roller.

13. An endless-loop tape cassette according to claim 7, wherein the rotating member coaxially supports a supporter with an operating lever and an engagement lever so as to be rotatable in an idle manner, the transmission mechanism coaxially supports a cooperating member engageable with the engagement lever so as to be relatively rotatable with respect thereto in a friction-contact state, and the operating lever is engaged with the backstop.

14. An endless-loop tape cassette according to claim 13, wherein the engagement lever is formed with an engagement hole, the cooperating member comprises a wire, and the wire has one end wound on a shaft of the transmission mechanism and the other end bent and held in the engagement hole.

15. An endless-loop tape cassette according to claim 13, wherein the supporter comprises a cylindrical member, and the cylindrical member has the operating lever and the engagement lever individually projected from an outer circumference thereof.

16. An endless-loop tape cassette according to claim 7, wherein the rotating member coaxially supports a supporter with an operating lever so as to be relatively rotatable with respect thereto in a friction-contact state, and the operating lever is engageable with the backstop.

17. An endless-loop tape cassette according to claim 16, wherein the backstop comprises an arm having a substantial C-shape, and the arm has an engagement side formed with an engagement notch.

18. An endless-loop tape cassette according to claim 16, wherein the supporter comprises a frame having one of a U-shape and an annular shape along an outer circumference of an annular projection of the rotating member, and the frame has a plurality of projections arranged on an inner circumference thereof at intervals, the projections being in a friction-contact state with the outer circumference of the annular projection of the rotating member.

19. An endless-loop tape cassette according to claim 18, wherein the supporter comprises an endless annular frame which has a thin-walled portion, and the thin-walled portion is formed with a deformation-absorbing portion.

* * * * *